March 20, 1951      H. S. DRAKE      2,545,545
DETACHABLE ARMREST FOR AUTOMOBILE SEATS
Filed Feb. 10, 1948
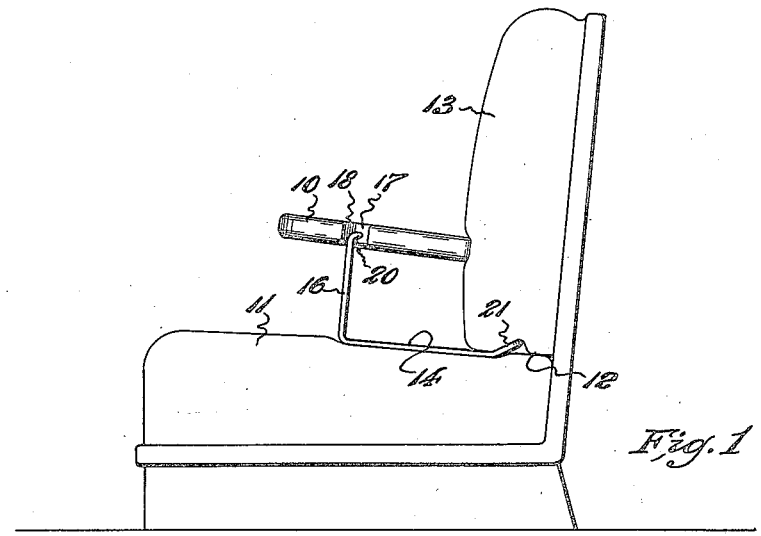
Fig. 1
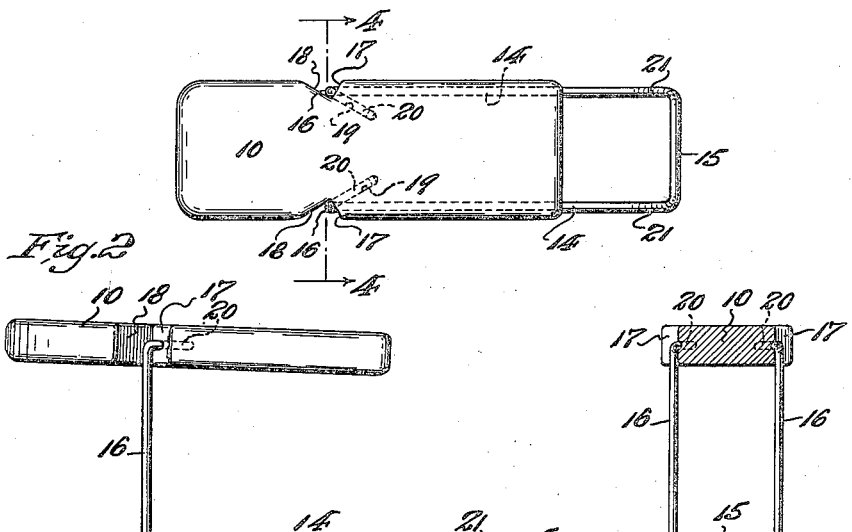
Fig. 2
Fig. 3
Fig. 4
INVENTOR.
Herbert S. Drake,
BY George D. Richards,
Attorney Patented Mar. 20, 1951

2,545,545

UNITED STATES PATENT OFFICE 2,545,545

DETACHABLE ARMREST FOR AUTOMOBILE SEATS

Herbert S. Drake, South Orange, N. J.

Application February 10, 1948, Serial No. 7,377

3 Claims. (Cl. 155—112)

This invention relates to an improved construction of arm rest device for detachable application to a seat of an automobile.

In many types of automobiles, the seats, and especially the front seats, lack arm rests intermediate their individual seating spaces. It has been observed that the comfort of the occupants of the seating spaces would be enhanced by the provision of intermediate arm rest means, and especially would the comfort of the occupant of the driver's seating space be enhanced by the provision of an arm rest device at the inner side of such space. Having this in view, it is an object of this invention to provide a novel construction of portable arm rest device which is adapted to be detachably applied to an automobile seat.

The invention has for a further object to provide a detachable arm rest device for an automobile seat which is of exceedingly simple and inexpensive construction; which is so constructed as to cooperate with the automobile seat upholstery in such manner as to firmly maintain itself against accidental displacement from its operatively attached relation to the seat, while nevertheless being adapted to be easily and quickly attached to or detached from said seat without necessity for disturbance of the seat structure or displacement of any part of the latter; and which is of sturdy and durable construction, well adapted to provide stable arm rest support when it is in operatively applied and assembled relation to an automobile seat.

Other objects of this invention, not at this time more particularly enumerated, will be understood from the following detailed description of the same.

An illustrative embodiment of this invention is shown in the accompanying drawings, in which:

Fig. 1 is a side elevational view of an automobile seat showing the novel arm rest device of this invention in applied operative assembled relation thereto; Fig. 2 is a top plan view of the arm rest device, drawn on a somewhat enlarged scale; Fig. 3 is a side elevational view of the same; and Fig. 4 is a transverse vertical sectional view of the same, taken on line 4—4 in Fig. 2.

Similar characters of reference are employed in the hereinabove described views, to indicate corresponding parts.

The arm rest device of this invention comprises an arm rest body 10 of suitable length, width and thickness; the same being elongated in form and preferably made of wood, plastic material or the like. The arm rest body 10 is attached to and so as to be supported by standard means having a base portion adapted to be footed upon the surface of the seat cushion member 11 of an automobile seat, and said base portion is provided, at its rearward end, with an upturned or upwardly inclined anchoring extension which is adapted to be inserted between said seat cushion member 11 and the bottom end 12 of the back cushion member 13 of an automobile seat, as shown in Fig. 1.

It will be understood that the standard means and its base portion and anchoring extension may be made of various materials and in varied form, according to the specific material selected for its construction; and the arm rest body 10 may be affixed to the standard means in various ways. In a preferred form of said standard means and its base portion and anchoring extension however, the same, as shown in the drawings, is made of a length of metallic rod stock of suitable cross-sectional size and shape. The length of rod stock is doubled upon itself to provide a U-shaped base portion formed by laterally spaced apart, longitudinally disposed, parallel side sections 14, joined at their rearward ends by a transverse end section 15. The forward free end portions of the side sections 14 of the base portion terminate in upturned laterally spaced apart standard legs 16, which thus upstand from and form integral parts of said base portion.

The upper free end portions of the standard legs 16 and the sides of the arm rest body 10 are provided with novel cooperative means for attaching the latter to the former in firmly coupled and supported relation. To this end, the opposite side marginal portions of the arm rest body 10 are each medially indented by a V-shaped notch which is defined by an inwardly and forwardly inclined rear wall 17 and a forward wall 18 perpendicular to said rear wall 17. Leading from each notch into the arm rest body 10 from the notch rear wall 17, in a direction perpendicular to the plane of the latter, is an elongated socket 19 which is thus inwardly and rearwardly inclined. The inner side of said socket is in substantial alignment with the notch forward wall 18. Each standard leg 16 terminates in a correspondingly inwardly and rearwardly inclined angular coupling member 20. To mount the arm rest body 10 in coupled supported relation to the standard legs 16, the latter are yieldably spread apart to respectively position their coupling members 20 contiguous to the forward walls 18 of the respective arm rest body notches, and so as to be aligned with and directed toward the respective sockets 19. When thus disposed, said angular coupling members 20 are thrust into the sockets 19, so as to be convergently embedded in the arm rest body 10, being retained therein by the resilient in-swinging tension of the standard legs 16. In this manner and by such means, the arm rest body 10 is securely joined to the standard legs 16 against accidental displacement therefrom, and so as to be firmly supported thereby. As will be obvious, this is accomplished without necessity for the use of independent or separate fastening means or separate coupling attachment devices, and reduces the arm rest device to an exceedingly simple structure comprising but two parts, viz. the arm rest body and the base portion having integral standard legs.

The base portion of the arm rest device, by which the arm rest body is supported, is so proportioned relative to the length of the rearward end portion of the arm rest body 10, which projects from the point of coupled connection of the latter with the standard legs 16, as to extend rearwardly a substantial distance beyond the plane of the rear end of said arm rest body. The free rearward end part of the base portion is formed to provide an anchoring extension 21 which is upwardly and rearwardly inclined so as to be divergent to the plane of said base portion.

To apply the arm rest device to an automobile seat in operative assembled relation thereto, the base portion is superposed upon the surface of the seat cushion member 11, and is then slid rearwardly thereon to pass the free rearward end part of said base portion between the surface of the seat cushion member 11 and the overlying contiguous bottom end 12 of the back cushion member 13, until the rear end of the arm rest body 10 is abutted against the outer face of said back cushion member (see Fig. 1). When the arm rest device is thus related to the automobile seat, the upturned or inclined anchoring extension 21, with which the rear end part of the base portion is provided, will be caused to indent the upholstery of the back cushion member (as also shown in Fig. 1). By reason of this said anchoring extension 21 will embed itself in the upholstery of the back cushion member 13, so as to substantially interlock therewith, and thus restrain the applied arm rest device against accidental outward displacement from its operative association with the automobile seat. Thus the arm rest device will be stabilized in its operative position, and the arm rest body 10 will be securely held and firmly supported for use. It will be obvious from the above that not only is the arm rest adapted to be easily and quickly mounted and securely held in connection with an automobile seat, ready for use, but also removal thereof from the seat, when its use is not desired, may as easily and quickly be accomplished, merely by pulling the base portion out and away from under the back cushion member 13.

The arm rest body 10 cooperates with the anchoring extensions 21 of the base portion in effecting a particularly firm interlocking engagement of the latter with the back cushion member 13. Due to the manner in which it is medially supported on standard legs 16, body 10 presses against back cushion member 13 with its rear end at a location spaced above seat cushion member 11. Consequently, this pressure will indent the back cushion member as shown in Fig. 1, after anchoring extension 21 has been inserted beneath the said cushion member, and will compress the cushion material that intervenes between the rear end of arm rest body 10 and the bulge that lies within the U-shaped anchoring extension. This action will stiffen the bulge and increase resistance to accidental forward displacement of the arm rest device. During the operation of installing and removing the device, resistance to insertion of anchoring extension 21 and withdrawal thereof, respectively, will be at a minimum when the rear end of arm rest body 10 is free from contact with back cushion member 13. The locking compression occurs only when the anchoring extension is fully engaged with the under part of the back cushion member.

While the arm rest body 10 has been shown as comprising an uncovered body of solid material, it will be obvious that, if so desired, the top surface thereof may be provided with upholstery or other soft cushioning means (not shown).

Some structural changes and variations of form may be made in the above described arm rest device, and consequently this invention is not to be deemed limited to the specific illustrative embodiment thereof, except as may be required by the scope of the herefollowing claims.

I claim:

1. A portable arm rest device for automobile seats comprising a U-shaped base portion whose side sections terminate opposite to the closed end thereof in upstanding standard legs, an elongated arm rest body surmounting said base portion in substantial horizontal parallelism therewith and having sockets extending horizontally into the opposite sides thereof, the said sockets being disposed oblique to the major axis of the arm rest body and inclined in the same direction, and obliquely inturned coupling members formed on the upper ends of said standard legs and being disposed so as to fit the arm rest body sockets for rigid support of said body, the base portion and its standard legs being resiliently yieldable laterally and normally unflexed in the assembled condition of arm rest body and coupling members.

2. A portable arm rest device for automobile seats comprising a U-shaped base portion whose side sections terminate opposite to the closed end thereof in upstanding standard legs, an arm rest body surmounting said base portion in substantial parallelism therewith and having V-shaped notches in the sides thereof disposed directly opposite to each other and comprising front and rear walls, said arm rest body being provided further with horizontal sockets respectively extending obliquely inward from rear walls of the respective notches and being substantially parallel to the front walls of said notches, and obliquely inturned coupling members formed on the upper ends of said standard legs and being disposed so as to fit the arm rest body sockets for rigid support of said body, the base portion and its standard legs being resiliently yieldable laterally and normally unflexed in the assembled condition of arm rest body and coupling members.

3. A portable arm rest device according to claim 2, wherein the U-shaped base portion terminates at its rear end in an upturned anchoring extension adapted to be engaged between the seat cushion and back cushion of an automobile seat so as to indent the latter.

HERBERT S. DRAKE.

(References on following page)

REFERENCES CITED

The following references are of record in the file of this patent:

UNITED STATES PATENTS

| Number | Name | Date |
|---|---|---|
| 1,378,704 | McFarland | May 17, 1921 |
| 1,753,367 | Dickens | Apr. 8, 1930 |
| 2,006,883 | Davies et al. | July 2, 1935 |
| 2,365,003 | Reinholz | Dec. 12, 1944 |
| 2,369,552 | Ferran | Feb. 13, 1945 |
| 2,505,463 | Crane | Apr. 25, 1950 |

FOREIGN PATENTS

| Number | Country | Date |
|---|---|---|
| 497,946 | Great Britain | Dec. 30, 1938 |